United States Patent
Boydston et al.

[11] Patent Number: 5,863,065
[45] Date of Patent: Jan. 26, 1999

[54] PORTABLE PASSENGER AIR BAG

[75] Inventors: L. E. Bailey Boydston, Clovis; George Wojdylak, Fresno, both of Calif.

[73] Assignee: Double Eagle Ltd, Inc., Fresno, Calif.

[21] Appl. No.: 415,070

[22] Filed: Mar. 31, 1995

Related U.S. Application Data

[63] Continuation of Ser. No. 941,165, Sep. 4, 1992, abandoned.

[51] Int. Cl.[6] .................................................. B60R 21/18
[52] U.S. Cl. ..................... 280/733; 280/730.1; 280/735
[58] Field of Search ............................. 280/733, 728.1, 280/728.2, 728.3, 730.1, 735, 736, 730.2

[56] References Cited

U.S. PATENT DOCUMENTS

| | | | |
|---|---|---|---|
| 3,888,503 | 6/1975 | Hamilton | 280/733 |
| 4,348,037 | 9/1982 | Law et al. | 280/733 |
| 4,695,075 | 9/1987 | Kamiji et al. | 280/735 |
| 4,971,354 | 11/1990 | Kim | 280/733 |
| 5,062,662 | 11/1991 | Cameron | 280/733 |
| 5,084,122 | 1/1992 | Fukushima et al. | 280/737 |
| 5,085,464 | 2/1992 | Behr et al. | 280/735 |
| 5,100,169 | 3/1992 | Goor et al. | 280/808 |
| 5,162,006 | 11/1992 | Yandle, II | 280/733 |

*Primary Examiner*—Eric D. Culbreth
*Attorney, Agent, or Firm*—Klima & Pezzlo, P.C.

[57] ABSTRACT

A portable air bag device that can be connected to a vehicle, for example to an existing restraint belt system of the vehicle. The portable air bag device includes an enclosure containing a gas pressure container, controllable release valve and control/sensor for activating the device during rapid deceleration.

8 Claims, 4 Drawing Sheets

PORTABLE PASSENGER AIR BAG

This is a continuation of U.S. patent application entitled "PORTABLE PASSENGER AIR BAG", Ser. No. 07/941,165 filed on Sep. 4, 1992, now abandoned.

FIELD OF THE INVENTION

The present invention is directed to a portable air bag that can be releasably connected to a vehicle to protect against injury during an accident.

PRIOR ART

Air bags have been in development for a number of years, and are currently being seriously introduced into new vehicles being sold today. The cost of adding air bags to vehicles has been a significant deterrent in the wide spread acceptance of this promising safety device.

The prior art air bags all require some type of permanent attachment to the vehicle. For example, many air bag models are associated with the steering column and dashboard of the vehicle, The prior art air bags are connected to the vehicle primarily to anchor the air bag or related mechanism securely. Other reasons for attaching the air bag to the vehicle including remote sensors and/or gas supplies that are integrally connected with the air bag.

SUMMARY OF THE INVENTION

An object of the present invention is to provide a portable air bag.

Another object of the present invention is to provide a portable air bag that cooperates with a vehicle restraint belt for operation thereof.

A further object of the present invention is to provide a portable air bag comprising an enclosure containing an air bag, gas pressure cylinder fluidly connected to the air bag, a controllable valve associated with the gas pressure cylinder, and a sensor/control for detecting an accident and controlling the activation of the device.

The present invention is directed to a portable air bag that can be carried around by an individual an moved with the person from one vehicle to the next. Portable air bags are not presently known or available. In order to allow an air bag device to be completely portable, the device must contain all the necessary component of fixed air bag type systems in a single portable unit. The desire for portability requires certain features and construction such as small size, light weight, compact construction and new arrangement in order to become successful in marketing and operation.

The portable air bag according to the present invention includes an enclosure that can be releasably connected to or anchored to a vehicle. The preferred connection is to an existing restraint belt system of the vehicle because of its location relative to a passenger and structural strength. Current vehicles are provided with the combination of lap and shoulder belts. Thus, the portable air bag device according to the present invention is preferably releasably connected to either or both of the lap and shoulder belts.

The device can be attached to the lap or shoulder restraint belt in various ways. The attachment should provide a strong and secure connection in order to maintain the proper location and orientation of the device during the rest stage while being worn by a passenger, and during the deployment stage. Further, the construction and materials of the enclosure and attachment must be durable and wearproof to provide years of use, and sufficiently strong to endure the loads during the deployment operation. It is anticipated that the enclosure and attachment will be made of acrylic backed nylon woven material.

The main components of the air bag device according to the present invention include a pressurized gas container and an inflatable air bag preferably folded in a desired manner, and located within an enclosure. The device includes means for deploying the air bag such as a sensor for detecting a situation requiring deployment of the air bag and a control for operating the deployment of the air bag based on the detection signal.

The preferred means for deploying the air bag includes an electrical sensor for sensing one or more conditions indicating an accident in combination with an electrical connection or control for operating a gas release valve on the gas pressure container such as a solenoid valve. The electrical sensor is preferably a pressure sensor or a plurality of pressure sensors positioned on or within the device in such a manner so as to detect a sudden deceleration of the vehicle. The preferred location of the sensor is between the passenger and the belt restraint to detect the pressure exerted by the passenger on the belt during rapid deceleration. In one embodiment, the sensor is placed on the flap of an attachment, which attachment is used for releasably connecting the device to the restraint belt of the vehicle.

The enclosure is designed to open in some manner upon the activation of the device causing the air bag to be inflated by the pressurized gas container such as a pressure cylinder. The enclosure can be provided with a rip seam so that the air bag being inflated bursts the rip seam. The rip seam can be a line of weakness in the material of the enclosure.

The gas pressure container is secured within the enclosure. For example, the gas pressure container can be applied with a Velcro fastener adhesively bonded to the outer surface of the gas pressure container, which Velcro fastener cooperates with a Velcro fastener connected to the enclosure.

DETAILED DESCRIPTION OF PREFERRED EMBODIMENTS

The portable air bag device according to the present invention must be connected to the vehicle in some manner after a passenger enters the vehicle and sits in position. The preferred connection is to a lap restraint belt or to a shoulder restraint belt, or both.

Figure 1:
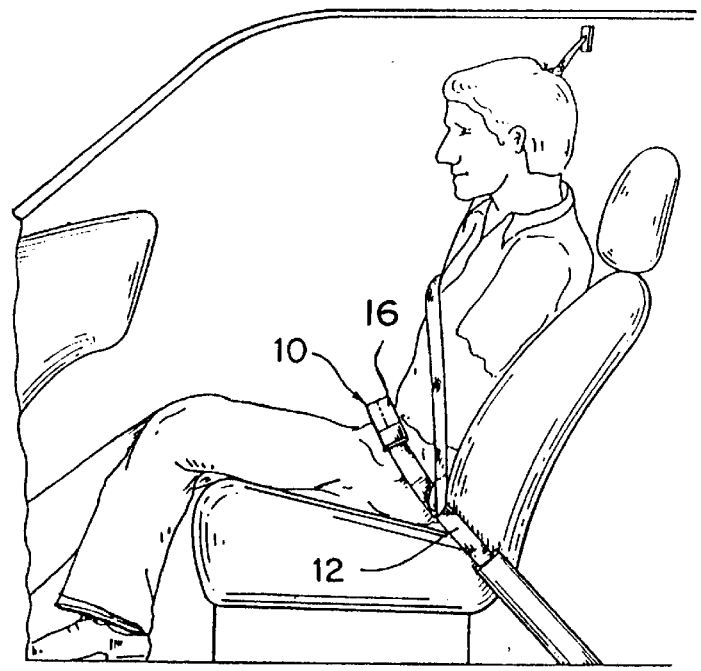
FIG. 1 is a side view of a passenger in a vehicle showing an air bag device according to the present invention connected to a lap restraint belt with the air bag uninflated.
Figure 2:
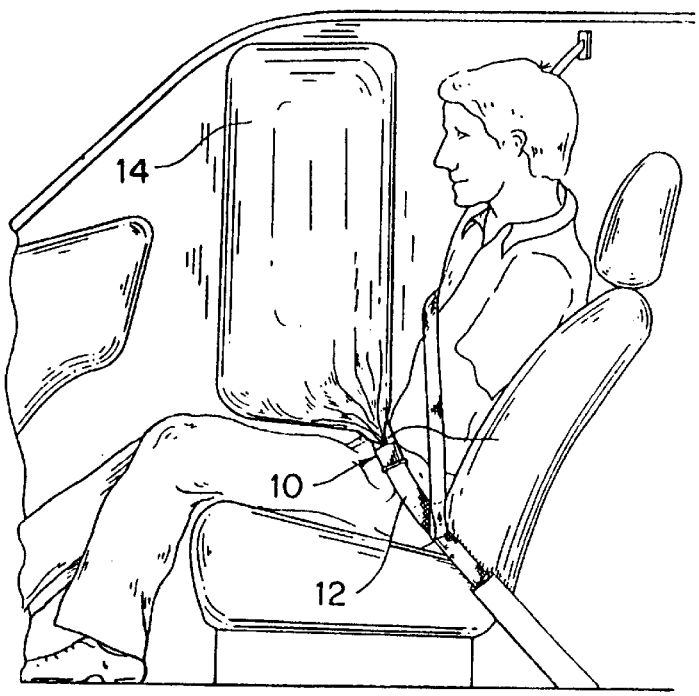
FIG. 2 is the same as FIG. 1, except with the air bag fully inflated.
Figure 3:
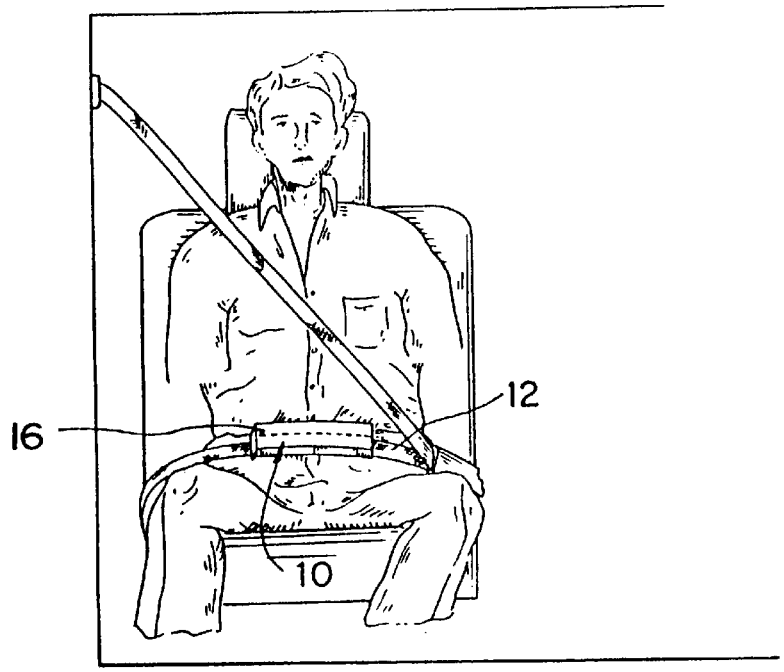
FIG. 3 is a front view of the passenger shown in FIG. 1.
Figure 4:
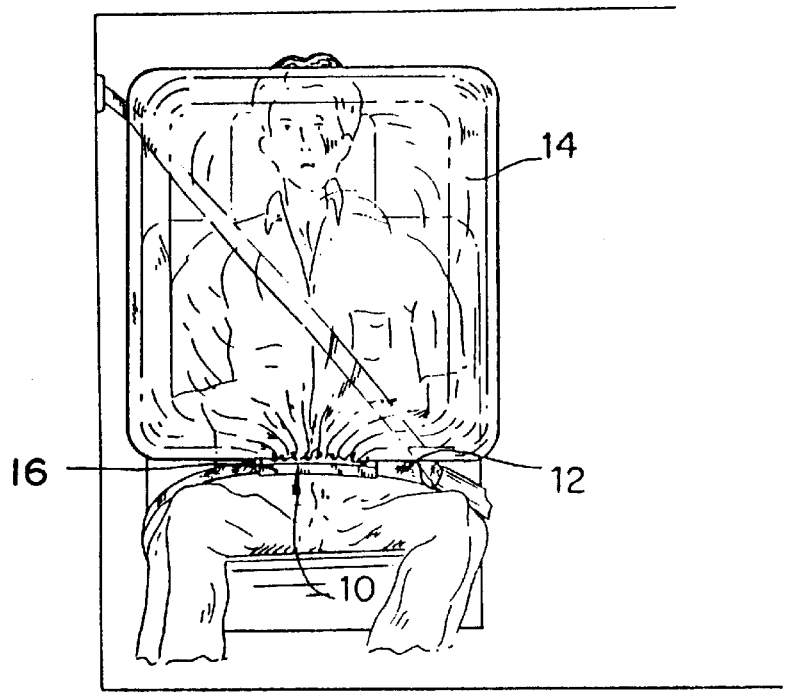
FIG. 4 is a front view of the passenger shown in FIG. 2.

FIGS. 1 and 3 show the air bag device 10 connected to a lap restraint belt 12 with an air bag (not shown) contained within the device in an uninflated manner. FIGS. 2 and 4 show the air bag 14 fully inflated after deployment, and connected to the enclosure 16.

Figure 5:
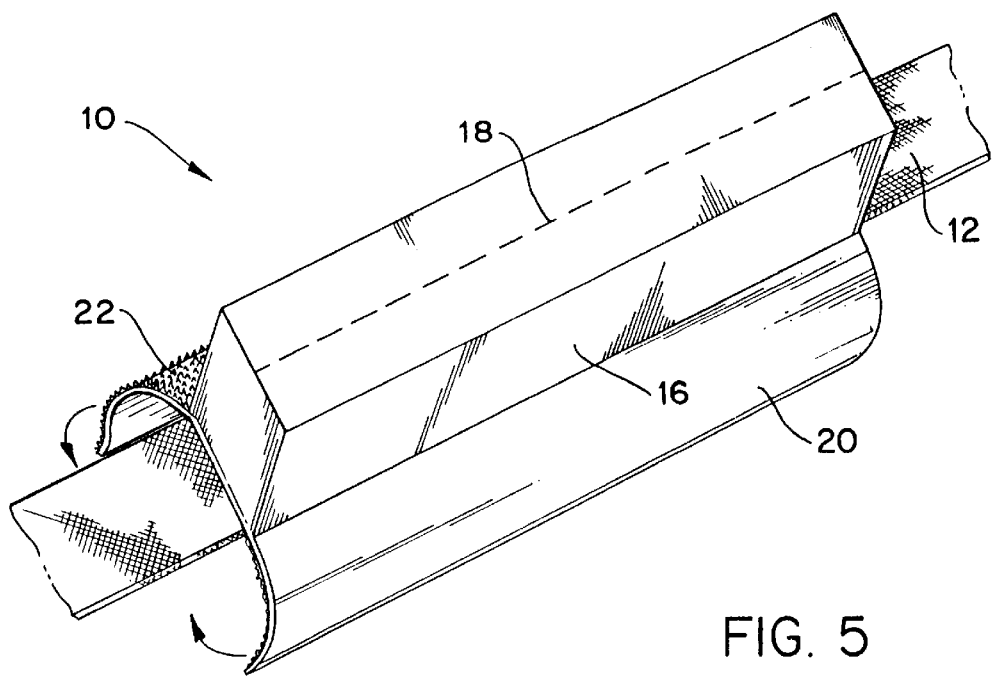
FIG. 5 is a perspective view of an embodiment of the air bag device according to the present invention.

An embodiment of the air bag device 10 is shown in FIG. 5. The device 10 includes an enclosure 16 with a rip seam 18 to allow egress of the air bag from the enclosure 16 during deployment. An attachment for connecting the enclosure 16 to the lap restraint belt 12 is defined by flaps 20 and 22 in this embodiment.

Figure 6:
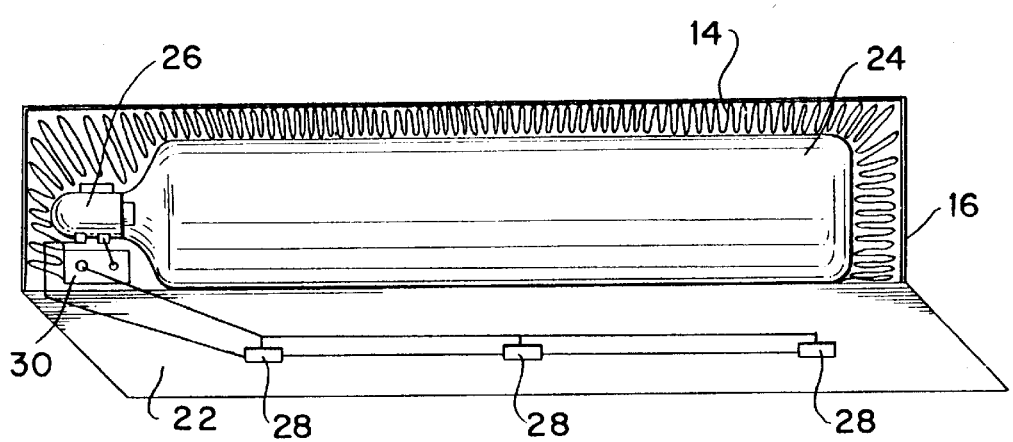
FIG. 6 is a break away bottom view of the air bag device shown in FIG. 5 exposing the gas pressure cylinder, cylinder valve, and energy source.
Figure 7:
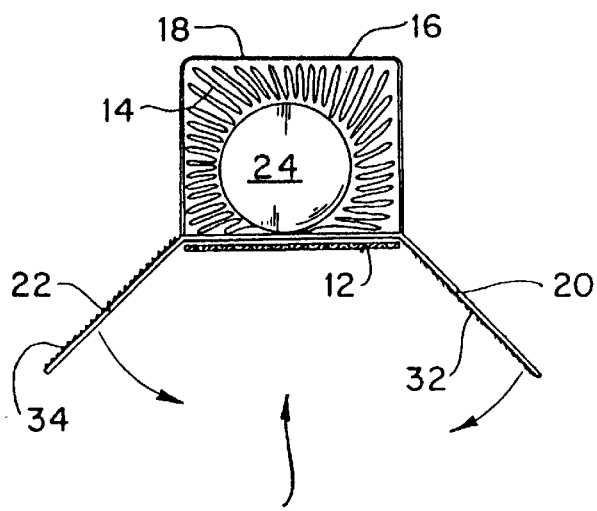
FIG. 7 is a side cross-sectional view of the air bag device shown in FIG. 6, with the flaps of the attachment in an open position.
Figure 8:
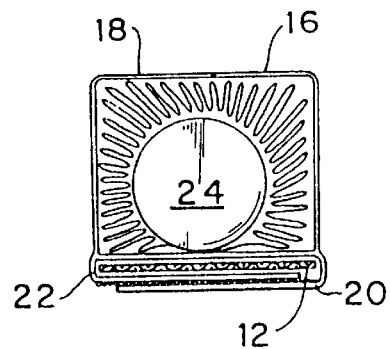
FIG. 8 is a side cross-sectional view of the air bag device shown in FIG. 6, with the flaps of the attachment in a closed or fastened position.

The contents of the enclosure 16 are shown in FIG. 6. The air bag device 10 comprises a pressure cylinder 24 fitted with a electrical controllable release valve 26 such as a solenoid valve. The flap 22 is provided with three (3) pressure sensors 28 wired to a power source 30, for example a battery, and the electrical controllable release valve 26. The pressure sensors 28 are preferably wired in parallel so that a single sensor can activate the device. However, other electrical circuit arrangements for the sensor system can be further developed to improve the reliability and accuracy of the sensing operation. The air bag 14 is folded and positioned in a space between the air cylinder 14 and enclosure 16. In FIGS. 6–8, the pressure cylinder 24 and electrical controllable release valve 26 are shown disposed within the air bag 14 for directly releasing gas into the air bag 14.

The air bag device is shown unattached to the restraint belt 12 is FIG. 7, and attached to the restraint belt 12 in FIG. 8. The flap 20 is provide with Velcro material 32 and flap 22 is provided with Velcro material 34. The flap 20 is folded over flap 22, as shown in FIG. 8, and pressed together to secure the air bag device 10 to the restraint belt 12.

Figure 9:
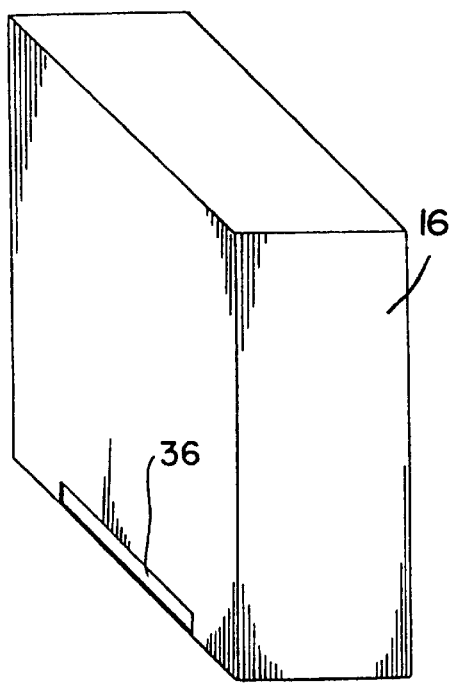
FIG. 9 is a perspective view illustrating the position of the connection of the air bag with the valve.
Figure 10:
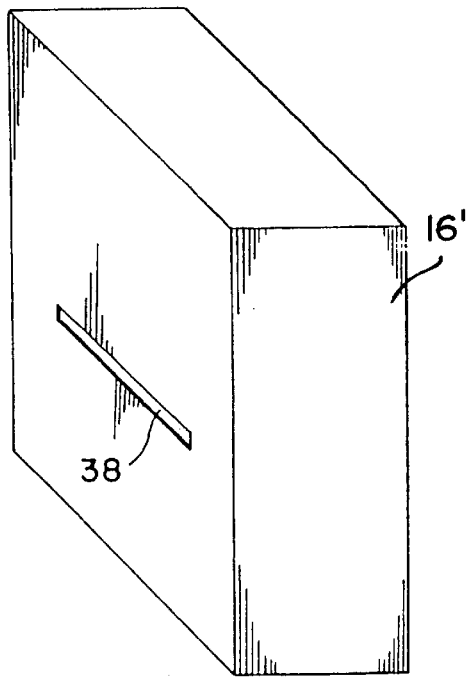
FIG. 10 is a perspective view illustrating the position of a different connection of the air bag with the valve.

FIG. 9 shows the location of the opening 36 into the air bag 14 where the release valve 26 attaches for an embodiment of the device that attaches to a lap type restraint belt. FIG. 10 shows the location of the opening 38 in the air bag 14' where the release valve 26 attaches for an embodiment of the device that attaches to a shoulder type restraint belt. The difference in the location of the opening between these two embodiments is for best positioning of the fully inflated air bag with respect the passenger.

OPERATION

A person carries the unattached portable air bag device into a vehicle while getting seated. The person puts on the seat belt and then fasteners the portable air bag to the lap or seat belt, or both in the case of two units.

The air bag remains in this rest stage until an occurrence such as an accident that results in a rapid declaration of the vehicle. The person's body in this situation will be moved forward with significant force due to deceleration stimulating the pressure sensors 28 in the device 10.

The one or more activated pressure sensors electrically connect the power source 30 to the electrical controllable release valve 26 causing it to open. The pressurized gas in the cylinder 24 exits and inflates the air bag 14 causing it to burst through the rip seam 18 of the enclosure 16, and positions itself properly between the passenger and steering column or dash board.

We claim:

1. A portable air bag device, comprising:

an enclosure;

an attachment associated with said enclosure for releaseably connecting the air bag device to a vehicle restraint belt, said attachment being defined by a set of overlapping flaps connected to said enclosure configured to wrap around a vehicle restraint belt and be releaseably connected together;

a gas container;

an electrical controllable release valve connected to said gas container;

an air bag connected to said enclosure, said gas container and said electrical controllable release valve disposed within said air bag for directly releasing gas into said air bag, said air bag being stored within said enclosure prior to deployment;

a sensor for sensing an air bag deployment condition; and a control for controlling operation of said electrical controllable release valve and deployment of said air bag upon receiving an activation signal from said sensor, said control and sensor being defined by a pressure sensor connected to a power source electrically connected to said electrical controllable release valve, said pressure sensor being provided on at least one of said overlapping flaps so as to be positioned between the passenger and vehicle restraint belt during operation.

2. A device according to claim 1, wherein said overlapping flaps are provided with Velcro fasteners for allowing said overlapping flaps to be releaseably connected together.

3. A device according to claim 1, wherein said enclosure is provided with a tearable seam for egress of said air bag from the enclosure during inflation.

4. A device according to claim 1, wherein said pressure sensor is defined by a plurality of pressure sensors positioned along a length of at least one of said overlapping flaps.

5. A portable air bag device, comprising:

an enclosure;

an attachment associated with said enclosure for releaseably connecting the air bag device to a vehicle restraint belt, said attachment being defined by a set of overlapping flaps connected to said enclosure configured to wrap around a vehicle restraint belt and releaseably connected together;

a gas container;

an electrical controllable release valve connected to said gas container;

an air bag connected to said enclosure, said gas container and said electrical controllable release valve disposed within said air bag for directly releasing gas into said air bag, said air bag being stored within said enclosure prior to deployment;

a sensor for sensing an air bag deployment condition; and a control for controlling operation of said electrical controllable release valve and deployment of said air bag upon receiving an activation signal from said sensor, said control and sensor being defined by a pressure sensor connected to a power source electrically connected to said electrical controllable release valve, said pressure sensor being defined by a plurality of pressure sensors positioned along a length of at least one of said overlapping flaps.

6. A device according to claim 5, wherein said overlapping flaps are provided with Velcro fasteners for allowing said overlapping flaps to be releaseably connected together.

7. A device according to claim 5, wherein said enclosure is provided with a tearable seam for egress of said air bag from the enclosure during inflation.

8. A device according to claim 5, wherein said pressure sensor is provided on one of said overlapping flaps so as to be positioned between the passenger and vehicle restraint belt during operation.

* * * * *